United States Patent [19]

Kleinhagen, Jr.

[11] 4,394,890
[45] Jul. 26, 1983

[54] AUTOMATIC SLACK ADJUSTER

[75] Inventor: Charles W. Kleinhagen, Jr., Battle Creek, Mich.

[73] Assignee: Eaton Corporation, Cleveland, Ohio

[21] Appl. No.: 289,030

[22] Filed: Aug. 3, 1981

[51] Int. Cl.³ .................................. F16D 65/56
[52] U.S. Cl. ........................................ 188/71.9
[58] Field of Search ............ 188/79.5 K, 79.5 GE, 188/71.9, 196 F, 196 D, 196 BA

[56] References Cited

U.S. PATENT DOCUMENTS

| | | |
|---|---|---|
| 3,211,263 | 10/1965 | Harrison . |
| 3,507,369 | 4/1970 | Oliver . |
| 3,547,229 | 12/1970 | Pollinger et al. . |
| 3,827,536 | 8/1974 | Ohmayer et al. ............ 188/196 F |
| 3,901,357 | 8/1975 | Reitz et al. . |
| 3,966,028 | 6/1976 | Anderson et al. . |
| 4,064,973 | 12/1977 | Deem et al. . |
| 4,085,830 | 4/1978 | Bottoms et al. . |
| 4,351,419 | 9/1982 | Garrett et al. ............... 188/71.9 |

Primary Examiner—Duane A. Reger
Attorney, Agent, or Firm—C. H. Grace; H. D. Gordon

[57] ABSTRACT

A single acting, clearance sensing slack adjuster for brakes is provided. The slack adjuster includes a displaceable brake actuation means (28), a rotatable driving member (74), and a rotatable driven member (82). A normally engaged positive clutch (64-66) provides a driving connection between the driven member and a rotatable adjustment member (50). The rotatable adjustment member is rotatable in a given direction to advance the brake friction member (32) to maintain the running clearance (38) within predetermined limits. The driving member is rotatable in the slack-decreasing direction of rotation thereof in response to greater than predetermined movement (102) of the brake actuation means. A force limiting coil clutch (80) couples the driving member to the driven member. Force limiting coil clutch (80) delivers torque in the given direction with a torque capacity which is less than is required to rotate the rotatable actuation members when the brake friction members are engaged but is greater than the torque required to rotate the rotatable actuation members when the brake friction members are not engaged. A fitting (104) accessible from the exterior of the housing (12) is provided for selectively disengaging the normally engaged positive clutch and for applying a rotational force to the rotatable adjustment member for manual adjustment of the brake slack.

28 Claims, 5 Drawing Figures

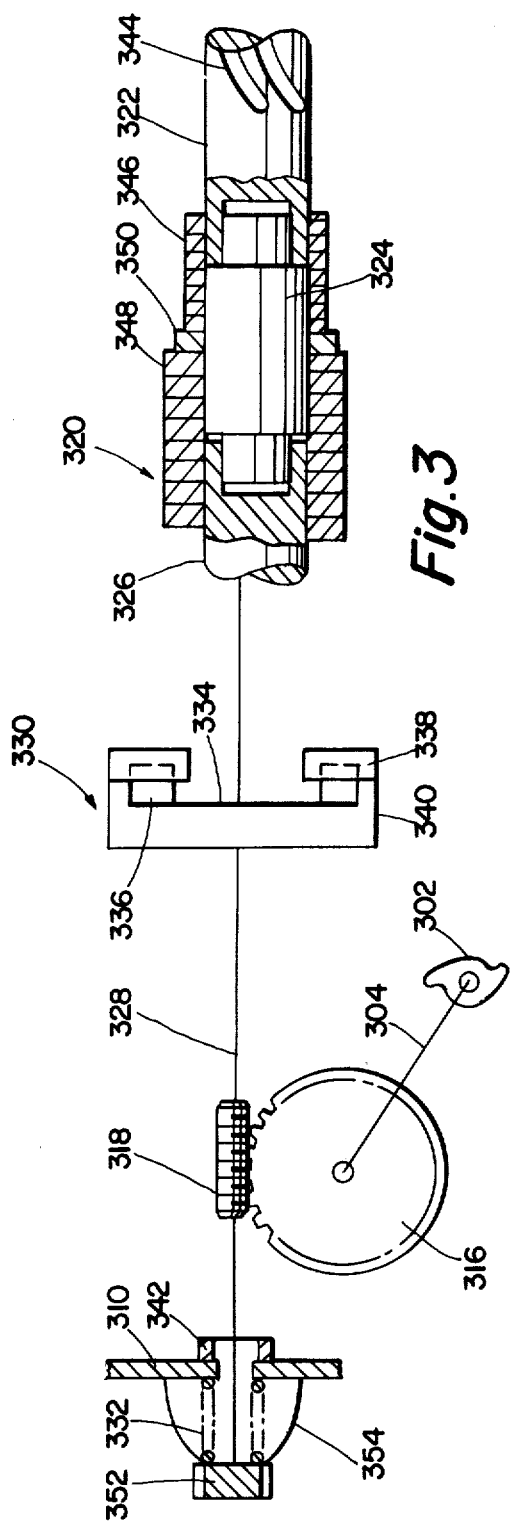
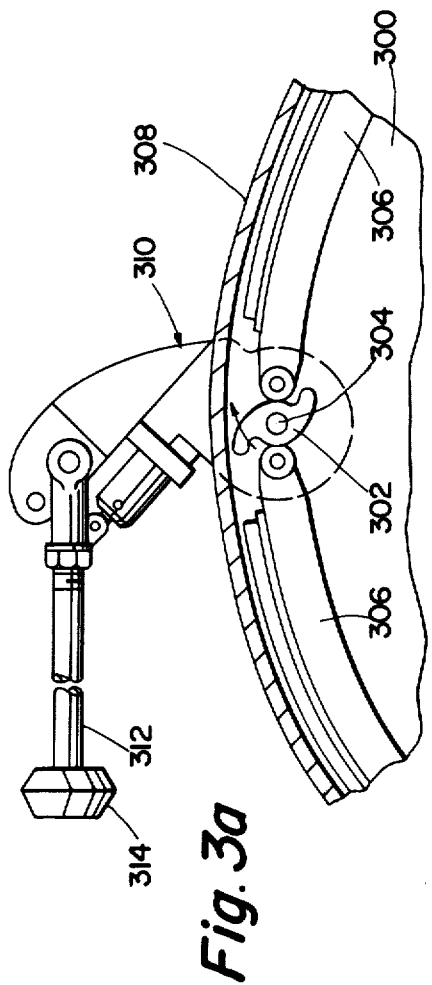
Fig. 3
Fig. 3a

AUTOMATIC SLACK ADJUSTER

BACKGROUND OF THE INVENTION

1. Field of the Invention

The present invention relates to automatic slack adjusters of the force or clearance sensing type and more particularly to force sensing, automatic, single acting (i.e. operates automatically in the slack take-up direction only) slack adjusters of the type utilizing a torque or force limited coil slip clutch to limit adjustment torque applied to a rotatable adjustment member wherein the force limiting automatic adjustment mechanism may be selectively disengaged from the rotatable adjustment member for purposes of manual adjustment.

2. Brief Description of the Prior Art

Automatic slack adjusters for railway brakes and automative brakes of both the disc and drum type are well known. In particular, single acting automatic vehicle slack adjusters of the force sensing type (also called the clearance sensing type) wherein the adjustment mechanism will sense the forces in the brake system and either disengage the adjustment mechanism or slip when forces exceed a predetermined level, usually corresponding to the expected forces in the system when the drums or discs are contacted by the movable friction elements, to prevent over adjustment are well known and may be appreciated in greater detail by reference to U.S. Pat. Nos. Re. 26,965 and 3,507,369, both of which are hereby incorporated by reference. Clearance sensing slack adjusters wherein a torque limited friction clutch of the coil slip clutch type is utilized to limit torque applied to an adjustment member are also known as may be seen by reference to U.S. Pat. Nos. 3,507,369 and 3,901,357, both of which are hereby incorporated by reference.

While the automatic clearance sensing slack adjusters of the prior art have been generally well received, certain of the prior art devices were not totally satisfactory as the torque limited coil slip clutches were utilized in the high torque transfer direction of rotation to rotate the adjustment member in the slack takeup direction and were thus subject to be extremely sensitive to variations in friction and lubrication making manufacture and maintenance of such automatic slack adjusters more difficult and more expensive.

The automatic clearance sensing slack adjusters of the prior art were also not totally satisfactory as it was difficult or impossible to disconnect or bypass the coil clutch mechanism for manual adjustment of the brakes, such as when new friction linings were to be installed, and thus the manual adjustment operation required overpowering of the coil clutch which often resulted in operator fatigue and/or undue wear on the coil clutch mechanism.

SUMMARY OF THE INVENTION

In accordance with the present invention, the drawbacks of the prior art have been overcome or minimized to the extent that an automatic clearance sensing slack adjuster of the type utilizing a torque limited coil slip clutch to limit torque applied to an adjustment member in the slack takeup direction of rotation is provided having a mechanism accessible from the exterior of the adjuster housing allowing sensitive disengagement of the coil clutch mechanism from the rotatable adjustment member for manual adjustment purposes.

The above is accomplished by providing a spring biased, normally engaged, two-way positive clutch connection between the coil clutch mechanism and the rotatable adjustment member. Means are provided to disengage the normally engaged positive clutch from the exterior of the slack adjuster housing for manual rotation of the rotatable adjustment member independently of the coil clutch mechanism.

In one embodiment of this invention, the normally engaged positive clutch can only be disengaged if the brake linings are removed. This feature assures that the clutch will remain engaged even if the biasing spring fails.

Accordingly, it is an object of the present invention to provide a new and improved automatic slack adjuster of the clearance sensing type.

Another object of the present invention is to provide an improved clearance sensing slack adjuster of the type utilizing a torque limited coil clutch to rotate an adjustment member wherein the adjustment member may be easily disconnected from the coil clutch from the exterior of the adjuster housing for manual slack adjustment purposes.

These and other objects and advantages of the present invention will become apparent from the reading of the detailed description of the invention taken in connection with the drawings.

BRIEF DESCRIPTION OF THE DRAWINGS

FIG. 1A is a partial view of a portion of the slack adjuster of FIG. 1.

FIG. 3 is a schematic illustration of the slack adjuster of the present invention as utilized in connection with a cam actuated, expanding shoe drum brake.

FIG. 3A is a partial view of a cam actuated drum brake utilizing the adjuster of FIG. 3.

DESCRIPTION OF THE PREFERRED EMBODIMENT

Figure 1:
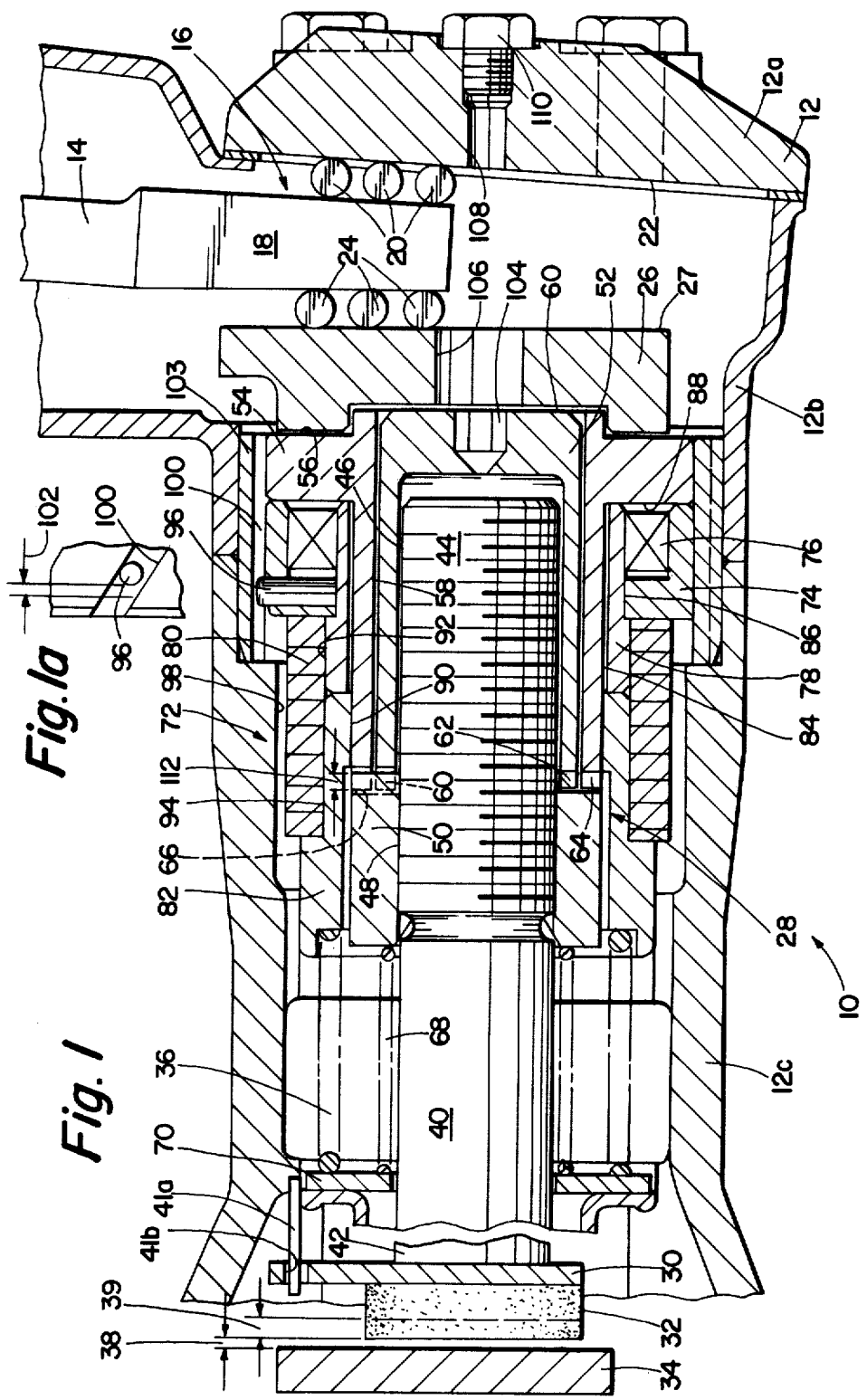
FIG. 1 is a partial sectional view of a wedge and roller actuated disc brake utilizing the slack adjuster of the present invention.

Certain terminology will be used in the following description for convenience in reference only and will not be limiting. The words "upwardly", "downwardly", "rightwardly", and "leftwardly" will designate the directions in the drawing to which reference is made. The words "clockwise" and "counter clockwise" will designate directions of rotation as viewed from the right of the drawings to which reference is made. The words "inwardly" and "outwardly" will refer to directions toward and away from, respectively, the geometric center of the device and designated parts thereof. Said terminology will include the words above specifically mentioned, derivatives thereof, and words of similar import.

The term "brake" as used in this description and in the claims is intended to include various frictional coupling devices, such as devices commonly referred to as brakes, clutches and the like.

One embodiment of the automatic slack adjuster of the present invention is illustrated as utilized with a disc brake wedge-type actuator in FIG. 1. The disc brake actuator-adjuster assembly 10 comprises a housing 12 which is mountable to a caliper (not shown) such as a floating caliper or the like. The housing and/or caliper are mounted to a support, such as vehicle axle or the like. The specific structure of the housing 12, which may comprise pieces 12a, 12b, and 12c and of the caliper forms no part of the present invention. An actuator motor, such as a well known fluid or air motor (not shown) is mountable to housing 12. The actuator is selectively actuable to force push rod 14 downwardly from the position shown in the drawing and a motor return spring (not shown) will return the push rod to the illustrated position. A roller or roller cage assembly 16 is mountable to the end 18 of the push rod 14 for linear movement therewith. One roller, or set of rollers 20, provides a bearing contact between the rod 18 and inclined surface 22 of housing piece 12a. The other roller, or set of rollers, 24, provides a force transmitting drive connection between the rod end 18 and surface 27 of tappet member 26 of the plunger assembly 28. The specific structural relationships of the push rod end 18, the roller cage 16 and surfaces 27 and 22 may be modified as is well known in the art and forms no part of the present invention. Wedge type actuators are illustrated in U.S. Pat. Nos. 3,547,229; 4,064,973 and 4,085,830 all of which are hereby incorporated by reference.

A brake shoe or pad 30 carrying a friction lining 32 of suitable friction material is mountable to the other (left) end of the plunger assembly 28. A disc 34 is located between shoe 30 and another shoe (not shown) and the shoe 30 will be forced leftwardly by the wedging action of the roller cage assembly 16 on tappet 26 to frictionally contact the disc 34 to retard rotary motion thereof relative to the housing 12. A return spring 36 is effective to urge plunger assembly 28 to the right to maintain the surface 27 of tappet 26 in contact with the roller cage assembly 16 and to maintain a running clearance, or slack, 38, between the friction material and the disc when the brake is not applied (i.e. released).

As is well known, to maintain the fluid motor stroke within its effective range and to maintain proper actuation times, the running clearance 38 should be maintained within predetermined limits. Thus, as the friction pad 32 wears, the brake shoe 30 should be advanced leftwardly relative to tappet 26 to take up the slack. Such slack takeup, or slack adjustment, may be accomplished manually or by an automatic slack adjuster which will sense greater than a predetermined maximum leftward movement of the plunger assembly 28 and adjust the position of the shoe 30 relative to the tappet 26 in response thereto. If a clearance sensing slack adjuster is utilized, the adjuster will sense when the pads engage the disc and cease adjustment at that point to prevent overadjustment in response to mechanical deflections, elasticity and the like.

As wear of the friction linings 32 exceeds a predetermined limit, represented by axial distance 39 in FIG. 1, the friction linings should be replaced.

The plunger assembly 28 comprises an elongated rod 40 which is axially movable but nonrotationally fixed to housing 12. In the embodiment shown, the nonrotational connection comprises a shaft 41a fixed to housing piece 12c which is slideably received in a bore 41b in shoe 30. Other means for such a nonrotational connection are possible and the specific structure utilized forms no part of the present invention. One end 42 of the rod 40 carries the brake shoe 30 while the other end 44 of the rod carries external threads 46 which are threadably engaged with the internal threads 48 carried by a nut member 50. In the embodiment shown, threads 46 and 48 are left hand threads. Nut member 50 is axially and rotatably movable in housing 12 and will move axially with tappet 26. Accordingly, nonrotational axial movement of nut member 50 will result in equal axial movement (disregarding mechanical deflections and elasticity) of rod 40 and shoe 30 while rotational movement of nut member 50 relative to rod 40 will result in a variation of the axial distance between shoe 30 and tappet 26. Nut member 50 is thus a rotational adjustment member and rotation of nut member 50 relative to rod 40 may be utilized to adjust the running clearance or slack 38. It is understood that the nut member 50 could be rotationally fixed in the housing and the rod member 40 rotatable relative to the nut member to achieve a slack adjustment and such a modification is contemplated within the scope of the present invention.

Leftward axial movement of tappet 26 is transmitted to nut member 50 and thus to rod 40 and shoe 30 by plunger assembly components manual adjuster barrel 52 and/or adjuster bushing 54. Adjuster bushing 54 is a generally tubular member and is piloted at its right end to the tappet 26. The manual adjuster barrel 52 is a generally cup shaped member with an outer periphery axially slidably received in the inner bore 58 of the adjuster bushing and its end wall adjacent to the tappet. The leftward faces of both the adjuster bushing 54 and the manual adjuster barrel 52 are provided with clutch teeth such as face splines, 62 and 64, respectively, for axial engagement with face splines 66 provided on the rightward face of nut member 50. A spring 68 biases nut member 50 to the right to normally maintain face splines 66 in engagement with face splines 62 and 64. A spring retainer 70 is utilized to seat both the return spring 36 and the clutch spring 68. Spring 68 is of a lower spring force and of a smaller outer diameter than return spring 36. Face splines 62, 64 and 66, acting under the bias of clutch spring 68 define a normally engaged, spring biased, two-way positive clutch connection as will be discussed in greater detail below. A force or torque limited coil clutch mechanism 72 is defined by a driving sleeve 74, a one-way clutch 76, an intermediate sleeve 78, a force limited coil clutch 80 and a driven sleeve 82. Intermediate sleeve 78 is rotationally supported on the outer periphery 84 of the adjuster bushing 54 while the driving sleeve 74 is rotationally supported on the outer periphery 86 of the intermediate sleeve 78. The right hand faces of both the driving sleeve 74 and the intermediate sleeve 78 abut a shoulder 88 on the adjuster bushing 54. The right hand face of driven sleeve 82 abuts the left hand face of the intermediate sleeve 78. Driven sleeve 82 is fixed to the adjuster bushing 54 for axial and rotational movement therewith. In the embodiment shown, the adjuster bushing 54 is fixed to the driven sleeve 82 at a serrated press fit 90. Adjuster bushing 54 and driven sleeve 82 could, of course, also be joined by welding or the like.

Return spring 36 acting on driven sleeve 82 provides a biasing force to urge the adjuster bushing 54 rightwardly into abutment with the tappet 26. Clutch spring 68, acting on nut member 50, provides a biasing force tending to maintain positive clutch spline teeth 62, 64 and 66 engaged and also urges friction linings 32 out of contact with disc 34.

Driving sleeve 74 is drivingly connected to the intermediate sleeve 78 by means of a one-way clutch 76. One way clutch 76 will transmit substantially all torque developed by the driving sleeve 74 in one direction of rotation to the intermediate sleeve 78 but will transmit an insignificant amount of torque developed by the driving sleeve to the intermediate sleeve in the other direction of rotation. Various types of clutches, such as certain coil clutches, sprag clutches, ratchet clutches and the like are suitable for this purpose and specific structure of one-way clutch 76 forms no part of the present invention.

Intermediate sleeve 78 defines an annular outer surface 92 which is adjacent, coaxial and of substantially the same outer diameter as in outer surface 94 defined by the driven sleeve 82. A force limiting coil clutch 80 having an interior diameter in the relaxed position thereof slightly less than the outer diameter of surfaces 92 and 94 is received in wrapped relationship on surfaces 92 and 94. It is understood that within the scope of the present invention, one of the adjacent outer surfaces may be of a slightly greater outer diameter, or of a higher coefficient of friction, to assure the other surface will be the slip surface.

At least one pin member 96 is fixed to driving sleeve 74 and extends radially outwardly toward the housing bore 98. The pins 96 are received in generally helical grooves 100 formed in the housing bore 98 of housing 12 with a predetermined amount of clearance or backlash therebetween (shown in slightly exaggerated form in FIG. 1a). Accordingly, axial movement of plunger assembly 28 to the left by greater than distance 102, the axial component of the clearance between pin 96 and grooves 100, will result in a clockwise, viewed from the right end of FIG. 1, rotation of driving sleeve 74. Distance 102 is selected so that it, in combination with the other backlash and the plunger assembly, will approximately equal the desired predetermined running clearance 38. For manufacturing purposes, the helical groove 100 may be formed in an insert 103 which is press-fit into the housing 12.

One way clutch 76 provides a rotational driving connection between driving sleeve 74 and intermediate sleeve 78. One way clutch 76 is designed such that its high torque transmitting capacity is in the clockwise direction of rotation of driving sleeve 74 while it is disengaged, slips or is in a low torque transmitting capacity when rotating in the counterclockwise direction of rotation.

Force limiting clutch 80 is wound such that when transferring clockwise torque from the intermediate sleeve to the driven sleeve, its torque transmitting capacity is greater than that required to rotate nut member 50 when the friction linings 32 are not in contact with the disc 34 but less than that torque required to rotate nut member 50 if the friction linings are in contact with the disc. The use of such force limiting slip clutches is well known in the art and may be appreciated in greater detail by reference to U.S. Pat. Nos. 3,507,369; 3,901,357 and 4,085,830.

In the preferred form of this invention, force limiting coil clutch 80 is wound to operate in its low torque transmitting direction of rotation when transferring clockwise torque from intermediate sleeve 78 to driven sleeve 82. In an adjuster of the type contemplated, coil clutch 80 will have a capacity to deliver about 200 inch pounds of clockwise torque from intermediate sleeve 78 to driven sleeve 82 in the clockwise direction. It has been found that, in an adjuster of the type contemplated, 200 inch pounds of torque is sufficient to overcome frictional resistances and to rotate sleeves 82 and nut member 50 to advance the position of shoe 30 if the linings 32 have not contacted the disc 34, but is insufficient to rotate driven shaft 82 if the linings 32 have contacted the disc. Coil clutch 82 thus acts as a torque or force limiting coupling for clearance sensing purposes in the low torque transmitting direction of rotation.

The utilization of coil clutch 80 as a torque limiting coupling operating in its low torque transmitting direction of rotation for advancement of the brake shoes (slack take-up direction) is especially advantageous. As is known (see co-pending application Ser. No. 147,643, filed May 7, 1980, now U.S. Pat. No. 4,351,419, and assigned to the assignee of this invention) in the high torque transmitting direction of rotation, the torque transmitting capacity (i.e. slip torque) is extremely sensitive to the coefficient of friction between the coil clutch and the coupled members. Accordingly, if the clutch is to be utilized as a torque limiting member in this direction of rotation, the surface finishes of the clutch and connecting members as well as the lubrication thereof must be very carefully controlled. In contrast, in the low torque transmitting direction of rotation, the torque transmitting capacity is quite stable and relatively insensitive to surface conditions and lubrication.

Driven sleeve 82 is fixed for axial and rotational movement with the adjuster bushing 54 as at serrated press-fit 90. The adjuster bushing is normally in driving relationship with nut member 50 by means of the normally engaged, two-way, spring-biased positive clutch connection defined by face splines 64 and 66 and clutch spring 68. Accordingly, rotation of driven sleeve 82 and adjuster bushing 54 which is fixed thereto will result in an equal rotation of nut member 50 for automatic slack adjustment purposes when the normally engaged clutch, 64 and 66, is engaged under the bias of spring 68.

The spring retainer 70 may be utilized to provide a seat for return spring 36 and clutch spring 68 and also to provide a bearing surface for axial movement of rod 40 in the housing 12. The return spring 36 acts on the driven sleeve 82 and the adjuster bushing 54 to bias the plunger assembly towards the roller assembly and also provides a resistance to rotation of adjuster bushing 54 which exceeds the counterclockwise torque transmitting capacity of the one-way clutch 76, but is less than the clockwise torque transmitting capacity of one-way clutch 76 and both the high and low torque transmitting capacities of coil clutch 80. Accordingly, counterclockwise rotation of driving sleeve 74 during the brake release operation will not cause a counterclockwise rotation of the adjuster bushing 54. Return spring 36 thus provides a highly desirable anti-back-off feature.

The manual adjustment barrel 52 is provided with a configured cavity 104 designed to receive a tool head such as a square driver or an Allen head wrench or the like for transmitting an axial and a rotational force on the manual adjustment barrel. Cavity 104 is aligned with a bore 106 in tappet 26 and a bore 108 in housing piece 12a allowing access to cavity 104 from the exterior of the disc brake 10 by a tool for manual rotation of nut member 50 as will be discussed below in greater detail. Bore 108 is sealed by a removable plug 110.

At such time as lining wear exceeds a predetermined limit, the friction linings must be replaced. To accomplish this, the worn shoes are removed and the push-rod 40 is retracted to the right so that the newly lined shoes can be installed and a predetermined running clearance established between the newly installed shoes and the disc. To relieve operator effort during the back-off operation, the operator places the end of a tool into cavity 104 and exerts a leftward axial force sufficient to compress spring 68, thus axially moving the manual adjustment barrel 52 and nut member 50 to the left, disengaging the normally engaged positive clutch connection between the nut member 50 and the adjuster bushing 54 defined by the face splines 64 and 66. With nut member 50 thus disengaged from the coil clutch mechanism 72, the nut member 50 may be rotated to retract the rod 40 without the effort required to overpower the coil clutch 80. Nut member 50 is rotated by the rotation of manual adjustment barrel 52 acting on nut member 50 through the face splines 62 and 66.

In the embodiment of FIG. 1, when nut member 50 is biased to the right under the influence of clutch spring 68, the face splines 64 and 66 are in driving engagement over an axial length 112 which is greater than the predetermined running clearance 38. Although this feature prevents the normally engaged clutch, 66–64, from being disengaged unless the linings are removed, it provides a safety feature of assuring that automatic slack adjustment will occur even if spring 68 fails. Should spring 68 fail, the driving engagement between adjuster bushing 64 and the nut member 50 will be maintained and the forces acting on the friction lining will tend to prevent the friction lining from acting on the disc. As manual adjustments are normally performed primarily at times of relining the disc brake 10, this is not believed to be a serious limitation.

In operation, when the brake is to be engaged, the actuator fluid motor forces push-rod 14 downwardly and the roller cage 16 acting against inclined surface 22, will force tappet 26 and the remainder of plunger assembly 28 leftwardly to engage the friction pad 30 with the disc 34. If the leftward axial movement of plunger assembly 28 is less than the backlash or lost motion 102, drive sleeve 74 will not be rotated.

However, if the running clearance 38 has become excessive and/or the force of the braking operation creates mechanical deflections in the brake assembly, the plunger assembly will move leftwardly by a distance greater than the distance 102 and the pin or pins 96 will engage the groove 100 in housing 12 causing the drive sleeve to be rotated in a clockwise direction. Substantially all of the clockwise torque from drive sleeve 74 will be transmitted to intermediate sleeve 78 by one-way clutch 74 acting in its effective torque transmitting direction of rotation. The clockwise torque from intermediate sleeve 78 will be transferred to driven sleeve 82 and to adjuster bushing 54 and then through the normally engaged positive clutch 64–66 to the nut member 50 by force limiting coil clutch 80 acting in its low torque transferred direction of rotation. The maximum clockwise torque transferred to the nut member 50 will thus be limited by the low torque transmitting capacity of coil clutch 80 and will be relatively stable and insensitive to the friction conditions between coil clutch 80 and the outer surfaces 92 and 94 of sleeve 78 and 82, respectively.

Accordingly, excessive axial movement of plunger assembly 28 will result in rotation of nut member 50 and advancement of rod 40 and shoe 30 towards the disc to take up excessive slack provided the torque required to rotate nut 50 does not exceed the low torque transmitting capacity of the force limited coil clutch 80. At such time as the shoe 30 firmly contacts the disc, further leftward movement of the plunger assembly will be the result of mechanical deflections and will not result in overadjustment of the brake as the torque required to rotate nut member 50 will exceed the low torque transmitting capacity of coil clutch 80 and that clutch will slip on surfaces 92 and/or 94.

Upon release of the brake, push-rod 14 will be upwardly retracted and the entire plunger assembly 28 will move rightwardly under the bias of return spring 36 to the at-rest position shown in FIG. 1. If drive sleeve 74 was rotated clockwise in the application stroke, it will be rotated in the counterclockwise direction during the return stroke. The counterclockwise torque applied to the driven sleeve 74 by pins 96 will not be transferred to intermediate sleeve 78 as one-way clutch 76 will either be disengaged or will slip or clutch 80 will slip and torque will not be transferred to sleeve 82.

If it is desired to manually back-off the adjuster (i.e. increase slack) for maintenance or the like with the linings in place, plug 110 is removed and the tool is inserted through bores 108 and 106 into tool head shaped cavity 104 and nut member 50 is rotated in the counterclockwise direction through barrel 52. Rotation of nut member 50 in the counterclockwise direction will be resisted by coil clutch 80 acting in the low torque transfer direction of rotation in series with one-way clutch 76 acting in its effective torque transfer direction of rotation and pins 96 engaging bore 100. Accordingly, to rotate the nut member 50 manually in the counterclockwise direction with the friction linings in place, a torque exceeding the sum of frictional resistances in the system and the low torque capacity of coil clutch 80 is sufficient. In practice, as the low torque transfer capacity of coil clutch 80 is about 200 inch pounds and is relatively insensitive to frictional conditions, manual back-off in these conditions will require an effort of about 200 inch pounds.

Figure 2:
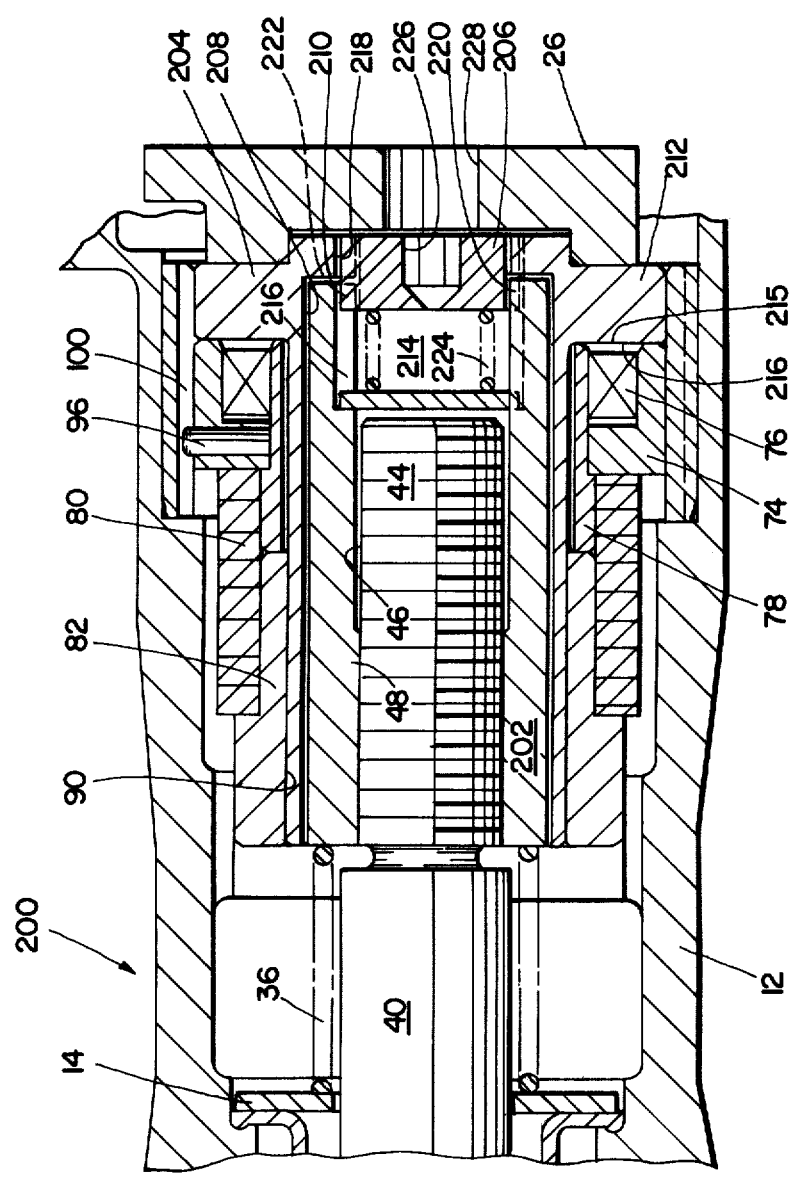
FIG. 2 is a partial sectional view of a wedge actuated disc brake utilizing an alternate embodiment of the present invention.

An alternate embodiment of the automatic slack adjuster of the present invention may be seen by reference to FIG. 2. In the wedge type disc brake actuator-adjuster assembly 200 of FIG. 2, elements identical and/or substantially identical in structure and in function to like elements in the embodiment illustrated in FIG. 1 will be assigned like reference numerals and will not be redescribed in detail. Assembly 200 includes a wedge actuator (not shown) and a caliper assembly including a friction lining (not shown) and a disc (not shown) similar to that illustrated in FIG. 1. Assembly 200 is intended to selectively engage a brake shoe with a disc and to maintain a predetermined running clearance between the brake shoe and the disc in much the same manner as the assembly 10 illustrated in FIG. 1.

Assembly 200 includes a housing 12 in which a push rod 40 is axially movable but rotationally fixed. A tappet 26 is provided for abutment with a wedge roller cage (not shown). End 44 of rod 40 carries external threads 46 which are threadably engaged with internal threads 48 caused by nut member 202. For the reasons discussed above in connection with nut member 50, nut member 202 is a rotatable adjustment member.

The assembly 200 includes an adjustment bushing 204, a manual adjustment barrel 206, a driving sleeve 74, a one-way clutch 76, a pin member 96 fixed to driving sleeve 74 and received in a helical slot 100 provided in housing 12, an intermediate sleeve 78, a force limiting coil clutch 80 and a driven sleeve 82. Driven sleeve 82 is fixed to adjuster bushing 204 for rotational and axial movement therewith as at serrated press fit 90.

Nut member 202 is slidably received in an enlarged inner bore 208 of the adjust bushing 204 and is biased rightwardly into engagement with an interior shoulder 210 provided in the adjuster bushing by return spring 36. Adjuster bushing 204 is provided with an exterior shoulder which under the bias of spring 36 abuts on its right face 215 with the tappet 26 and abuts on its left face 216 with the driving sleeve 74.

Nut member 202 defines a cavity 214 at its rightward end which is provided with internal splines 216. Adjuster bushing 204, at its rightward end defines a bore 218 which is provided with internal splines 220. Cavity 214 and bore 218 are adjacent and coaxially aligned and internal splines 216 and 220 are of substantially identical shape. Manual adjustment barrel 206 is provided with external splines 222 engageable with both the internal splines 216 and 220. A clutch spring 224 biases manual adjustment barrel to the right to provide a normally engaged positive clutch connection between adjustment bushing 204 and nut member 202. As the axial length of cavity 214 is greater than the axial length of manual adjustment barrel 206, the barrel 206 may be urged to the left against the bias of spring 224 to disengage the nut 202 from the adjustment bushing 204.

A manual adjustment barrel 206 is provided with a configured cavity 226 to receive a tool head for applying an axial and the rotational force to the barrel 206. Accordingly, when it is desired to manually adjust the device, such as when backing off rod 40 to install new friction linings, a tool is inserted from the exterior of the housing, through bore 228 in the tappet and into cavity 226. By applying an axial force sufficient to compress spring 224, the barrel 206 may be moved leftwardly to disengage spline teeth 222 from spline teeth 220 on adjuster bushing 204 thereby disengaging the normally engaged positive clutch connection between the nut member 202 and the adjuster bushing 204 and driven sleeve 82 fixed thereto. The nut member 202 may then be rotated in either direction to axially advance or retract the rod 40 relative to the tappet 26. This manual adjustment may be accomplished without the requirement of overpowering the coil clutch 80 with the linings removed or the linings in place. The brake application and automatic force sensing adjustment operations of actuator/adjuster assembly 200 is substantially identical to that described above for assembly 10 and will not be described again.

An alternate embodiment of the present invention as utilized with a cam operated expanding shoe drum brake is schematically illustrated in FIGS. 3 and 3A. In FIG. 3A a drum brake assembly comprising a support 300 rotatably supporting a brake actuation cam 302 nonrotationally fixed to a cam shaft 304 for pivoting arcuate brake shoes 306 radially outwardly into frictional contact with a brake drum 308 is illustrated. A lever housing assembly 310 is adjustably rotationally fixed to cam shaft 304 and is pivotable under the action of rod 312 which is driven by an actuation motor such as a fluid motor 314. As is known, the slack adjuster is housed in lever 310 and is effective to control the running clearance between shoes 306 and drum 308 by adjustment of the rotational position of operating cam 302 relative to the lever 310.

Briefly, operating cam 302 is selectively rotatable to cause expansion of pivotable brake shoes 306 into frictional contact with the rotatable brake drum 308 to retard rotational motion of the brake drum. The rotational position of the cam 302 relative to the actuating lever 310 is utilized to adjust the running clearance between the shoes and drums to compensate for wear and the like. Drum brakes utilizing such adjusters are well known in the art and may be appreciated in greater detail by reference to the above-mentioned U.S. Pat. No. 3,507,369.

The cam 302 is fixed to a cam shaft 304 which in turn is fixed to a worm gear 316 rotatably mounted in the lever. A worm 318 is rotatably mounted in the lever and engaged to the worm gear 316. Controlled rotation of the worm and resulting controlled rotation of the worm gear, the cam shaft and the cam relative to the lever is effective to adjust the running clearance or slack of the brake. The worm (and worm shaft) is thus a rotatable adjustment member. The automatic clearance sensing slack adjuster 320 includes a driving shaft 322, an intermediate shaft 324 and a driven shaft 326. Shafts 322, 324 and 326 are coaxial, rotatable relative to the lever housing 310 and to each other and define outer annular surfaces of substantially equal diameter. Shaft 326 is coupled to worm shaft 328 by a normally engaged, two-way positive clutch 330 which is biased into engagement by clutch spring 332. Briefly, shaft 326 which is axially fixed to the lever housing 310 carries a disc 334 having rightwardly facing clutch teeth 336 which are normally engaged with leftward facing clutch teech 338 carried by hood member 340 fixed to worm shaft 328. Worm shaft 328 may be moved axially to the right against the bias of spring 332 to cause clutch teeth 338 to move out of engagement with clutch teeth 336 to disengage clutch 330.

Worm shaft 328 may be frictionally grounded, as at friction clutch 342 to the lever. Means are provided such as helical splines 344, to impose a clockwise rotation to driving shaft 332 in response to the lever 310 being rotated beyond the predetermined annual departure from the at-rest position thereof, such an angular departure being indicative of a greater than desired running clearance and/or of mechanical deflections. The worm and worm gear are configured such that clockwise rotation of the worm 318 will advance the cam 302 in the slack decreasing or slack take-up direction of rotation.

The adjuster mechanism 320 also includes a first coil clutch 346 wrapped around the adjacent ends of shafts 322 and 324 and a second coil clutch 348 wrapped around the adjacent ends of shaft 326 and 324. Coil clutch 346 is wound to transfer torque clockwise in the high torque transfer direction of rotation while coil clutch 348 is wound to transfer torque clockwise in the low torque transfer direction of rotation. A washer 350 may be interposed coil clutches 346 and 348. A fitting, such as a hex shaped shaft end 352 accessible from the exterior of the housing, may be provided for applying a rotational and an axial force to shaft 328 for manual backoff of the slack adjuster. Frictional grounding clutch 342, in combination with the other frictional resistances to rotation in the system, provides a torque tending to resist rotation of worm shaft 328 which is greater than the counterclockwise low torque capacity of coil clutch 346 to prevent undesirable backing off during counterclockwise rotation of means 344. Clutch 342 will also resist rotative forces on the worm gear caused by forces applied to the cam 302 during brake operation. It is understood that coil clutch 346 could be replaced by a one-way clutch or a ratchet device. A boot member, 354, may be utilized to seal the housing at shaft end 352.

The operation of the automatic adjuster 320 is similar to the automatic adjustment operation of the device described in FIG. 1 and in U.S. Pat. No. 3,507,369, and will not be described again in detail.

Although this invention has been described in its preferred embodiment with a certain degree of particularity, it is understood that the present disclosure of the preferred forms has been made by way of example only and that numerous changes in the details of construction and the combination and arrangement of the parts may be resorted to without departing from the spirit and the scope of the invention as hereinafter claimed.

I claim:

1. An automatic, clearance sensing slack adjuster for maintaining a predetermined running clearance between the selectively engageable and disengageable friction surfaces of a brake comprising:
   a housing;
   a displaceable brake actuation means displaceable relative to said housing;
   a rotatable driving member rotationally received in said housing;
   means for rotating said driving member in response to greater than predetermined displacement of said brake actuation means;
   a rotatable driven member rotationally received in said housing, said driven member rotatable relative to said driving member;
   a rotatable adjustment member rotationally received in said housing, rotation of said adjustment member in a given direction of rotation effective to decrease slack in the brake and in the other direction of rotation to increase slack in the brake;
   a normally engaged positive clutch for rotationally coupling said rotatable adjustment member to said driven member;
   a force limiting friction clutch for rotationally coupling said driving member to said driven member, the torque transfer capacity of said force limiting friction clutch when rotating said driven member in the direction of rotation which will cause said adjustment member to be rotated in said given direction of rotation being greater than the torque required to rotate said adjustment member when said brake friction surfaces are not in contact but being less than the torque required to rotate said adjustment member when said brake friction surfaces are in contact; and
   means accessible from the exterior of said housing for disengaging said normally engaged positive clutch and for simultaneously rotating said rotatable adjustment member.

2. The adjuster of claim 1, wherein said means for rotating said driving member is inoperative to rotate said adjustment member in said other direction of rotation against frictional resistances to such rotation.

3. The adjuster of claim 1, wherein said normally engaged positive clutch comprises a first set of clutch teeth fixed to said rotatable adjustment member and extending in a first axial direction therefrom, a second set of clutch teeth fixed to said driven member and extending in the second axial direction therefrom, and a third set of clutch teeth fixed to an axially movable adjustment barrel and extending in said second axial direction therefrom, said first set of clutch teeth axially engageable with said second and third sets of clutch teeth simultaneously, said adjustment barrel axially and rotationally movable relative to said driven member, a first spring biasing said driven member in said first axial direction, a second spring biasing said rotatable adjustment member in said first axial direction to bias said first set of clutch teeth into positive engagement with said second and third sets of clutch teeth and wherein said means accessible from the exterior of said housing comprises a fitting fixed to said adjustment barrel and engageable from the exterior of said housing by a tool for applying a rotational force to said barrel and an axial force in said second axial direction on said barrel effective to overcome said bias of said second spring to move said barrel and said adjustment member in said second axial direction to separate the first and second sets of clutch teeth while retaining said first and third sets of clutch teeth in engagement.

4. The adjuster of claim 1 wherein said normally engaged positive clutch comprises a first set of clutch teeth fixed for rotation with said driven member, a second set of clutch teeth fixed for rotation with said rotatable adjustment member, a transfer member axially movable relative to said driven member and having clutch teeth simultaneously engageable with said first and second set of clutch teeth in a first axial position and engageable with said second set of clutch teeth only in a second axial position and a spring biasing said transfer member to said first axial position, said means accessible from the exterior of said housing comprising a fitting fixed to said transfer member and engageable from the exterior of said housing by a tool for applying a rotational and an axial force to said transfer member.

5. The adjuster of claim 1, wherein said normally engaged positive clutch comprises a first axially movable positive clutch member carrying clutch teeth axially engageable and disengageable from clutch teeth carried by an axially fixed second positive clutch member fixed for rotation with said driven member, said first positive clutch member rotatable with said rotatable adjustment member and a spring for biasing said first positive clutch member clutch teeth into engagement with said clutch teeth carried by said second positive clutch member and wherein said means accessible from the exterior of said housing comprises a fitting engageable by a tool from the exterior of said housing for applying an axial and a rotational force to said second positive clutch member.

6. The adjuster of claims 3, 4 or 5, wherein said force limiting friction clutch is a coil clutch.

7. The adjuster of claim 6, wherein said coil clutch is wound to transfer torque in the low torque transfer capacity direction of rotation thereof when rotating said ajustment member in said given direction of rotation.

8. The adjuster of claim 7, wherein said means for rotating said driving member includes a one-way clutch.

9. The adjuster of claims 3 or 4 wherein said fitting comprises a contoured cavity and said housing is provided with a through bore aligned with said cavity and a removable plug member for selectively sealing said through bore.

10. The adjuster of claim 5, wherein said fitting comprises a contoured shaft end extending from said housing.

11. An automatic, single acting, clearance sensing slack adjuster for maintaining a predetermined running clearance between the selectively engageable and disengageable friction surfaces of a brake comprising:
   a housing;
   a displaceable brake actuation means displaceable relative to said housing;

a rotatable driving member rotationally received in said housing;

means for rotating said driving member in response to greater than predetermined displacement of said brake actuation means;

a rotatable intermediate member rotationally received in said housing and coaxial with said driving member, said intermediate member rotatable relative to said driving member;

a rotatable driven member rotationally received in said housing and coaxial with and adjacent said intermediate member, said driven member rotatable relative to said intermediate member;

a rotatable adjustment member rotationally received in said housing, rotation of said adjustment member in a given direction of rotation effective to decrease slack in the brake and in the other direction of rotation to increase slack in the brake;

a normally engaged, positive clutch for rotationally coupling said driven member to said rotatable adjustment member;

a one-way clutch for rotationally coupling said driving member to said intermediate member, said one-way clutch effective to transfer torque in the direction causing rotation of said adjustment member in said given direction;

a force limiting coil clutch for rotationally coupling said intermediate member to said driven member, the torque transfer capacity of said coil clutch in said given direction of rotation greater than the torque required to rotate said adjustment member when said brake friction surfaces are not in contact but less than the torque required to rotate said adjustment member when said brake friction surfaces are in contact; and means accessible from the exterior of said housing for disengaging said normally engaged positive clutch and for simultaneously rotating said rotatable adjustment member.

12. The adjuster of claim 11 wherein said normally engaged positive clutch comprises a first axially movable positive clutch member carrying clutch teeth axially engageable and disengageable from clutch teeth carried by an axially fixed second positive clutch member fixed for rotation with said driven member, said first positive clutch member rotatable with said rotatable adjustment member and a spring for biasing said first positive clutch member clutch teeth into engagement with said clutch teeth carried by said second positive clutch member and wherein said means accessible from the exterior of said housing comprises a fitting engageable by a tool from the exterior of said housing for applying an axial and a rotational force to said second positive clutch member.

13. The adjuster of claim 11, wherein said normally engaged positive clutch comprises a first set of clutch teeth fixed to said rotatable adjustment member and extending in a first axial direction therefrom, a second set of clutch teeth fixed to said driven member and extending the second axial direction therefrom, a third set of clutch teeth fixed to an adjustment barrel and extending in the second axial direction therefrom, said first set of clutch teeth axially engageable with said second and third sets of clutch teeth simultaneously, said adjustment barrel rotatably and axially movable relative to said driven member, a first spring biasing said driven member in said first axial direction, a second spring biasing said rotatable adjustment member in said first axial direction for biasing said first set of clutch teeth into engagement with said second and third set of clutch teeth, and wherein said means accessible from the exterior of said housing comprises a fitting fixed to said adjustment barrel and engageable from the exterior of said housing by a tool for applying an axial force in said second axial direction and a simultaneous rotational force to said barrel, movement of said adjustment barrel in said second axial direction against the bias of said second spring effective to maintain said first set of clutch teeth in axial engagement with said third set of clutch teeth while separating said first set of clutch teeth from said second set of clutch teeth.

14. The adjuster of claim 11, wherein said normally engaged positive clutch comprises a first set of clutch teeth fixed for rotation with said driven member, a second set of clutch teeth fixed for rotation with said rotatable adjustment member, a transfer member axially movable relative to said driven member and having clutch teeth simultaneously engageable with said first and second set of clutch teeth in a first axial position and engageable with said second set of clutch teeth only in a second axial position and a spring biasing said transfer member to said first axial position, said means accessible from the exterior of said housing comprising a fitting fixed to said transfer member and engageable from the exterior of said housing for applying a rotational and an axial force to said transfer member.

15. The adjuster of claims 12, 13 or 14, wherein said coil clutch is wound to transfer torque in the low torque transfer capacity direction of rotation thereof when rotating said adjustment member in said given direction or rotation.

16. The adjuster of claim 3 or 13, wherein said brake friction linings are axially movable with said rotatable adjustment member and the axial movement of said adjustment member required to fully disengage said first set of clutch teeth from said second set of clutch teeth is greater than the predetermined running clearance.

17. The adjuster of claims 3 or 11, wherein one of said means for rotating said driving member and said driving member is axially movable in said housing as a result of displacements of said brake actuation means in one of said means for rotating said driving member and said driving member is provided with generally helical grooves in which are received pin members carried by the other of said means for rotating said driving member and said driving member, said pin members received in said helical grooves with a backlash corresponding to expected relative axial movement between said means for rotating said driving member and said driving member in conditions wherein the running clearance between the brake friction surfaces is within predetermined acceptable limits.

18. The adjuster of claims 4 or 14 wherein said first and second sets of clutch teeth are internal splines formed in adjacent and coaxial bores and the clutch teeth carried by said transfer member are external splines adapted for engagement with said internal splines.

19. A disc brake actuation assembly including an automatic single-acting clearance sensing slack adjuster for maintaining a predetermined running clearance between the brake friction pad and the disc, said assembly comprising:

a support;

a disc rotatable relative to said support;

an actuator housing nonrotationally fixed to said support;

at least one friction pad axially movable relative to said support for selective engagement with said disc to retard rotational movement of said disc relative to said support;

a plunger assembly axially movable in said housing, said friction pads mounted to one end of said plunger assembly, said plunger assembly comprising a nut member and a rod member threadably engaged at one end thereof to said nut member and carrying said friction pad at the other end thereof, one of said nut and rod members being rotationally fixed to said housing whereby rotation of the other of the nut and rod member in a given direction of rotation will result in axial movement of said pad relative to said nut member towards said disc and rotation in the other direction of rotation will result in axial movement of said pad relative to said nut member away from said disc;

a wedge actuator assembly mounted to said housing, said wedge actuator assembly comprising an actuator motor, a push-rod and a roller assembly mounted to said push-rod, said roller assembly engaging the other end of said plunger assembly and effective upon extension from said actuator motor to force said plunger assembly towards said disc;

a return spring biasing said plunger assembly toward said roller assembly;

a driving member rotatable in said housing;

means for rotating said driving member in response to greater than predetermined axial displacement of said plunger assembly;

an intermediate member rotatable in said housing, said intermediate member coaxial with said driving member, said intermediate member rotatable relative to said driving member;

a driven member rotatable in said housing, said driven member coaxial with and adjacent said intermediate member, said driven member rotatable relative to said intermediate member;

a normally engaged positive clutch for rotationally coupling said driven member to the rotatable one of said rod and nut member;

a one-way clutch for rotationally coupling said driving member to said intermediate member, said one-way clutch effective to transfer torque in the direction of rotation causing rotation of said rotatable one of said nut and rod member in said given direction of rotation, said one-way clutch inoperative to rotate said intermediate member in the direction of rotation causing rotation of the rotatable ones of said nut and rod member in said other direction of rotation against the frictional resistances to such rotation;

a torque limited coil clutch for rotationally coupling said intermediate member to said driven member, said coil clutch wound to transfer torque from said intermediate member to said driven member in the direction of rotation causing rotation of the rotatable one of said nut and rod member with a torque transfer capacity greater than the torque required to rotate said rotatable one of said nut and rod members when said brake friction pad and disc are not in contact but less than the torque required to rotate said rotatable one of said nut and rod members when said friction pad and disc are in contact; and means accessible from the exterior of said housing for selectively disengaging said normally engaged positive clutch and for rotating the rotatable one of said nut and rod member.

20. The adjuster of claim 19, wherein said normally engaged positive clutch comprises a first set of clutch teeth fixed for rotation with said driven member, a second set of clutch teeth fixed for rotation with said rotatable one of said rod and nut member, and a transfer member axially movable relative to said driven member and having clutch teeth engageable with said first and second set of clutch teeth in a first axial position and with said second set of clutch teeth only in a second axial position and a spring biasing said transfer member to said first axial position, said means accessible from the exterior of said housing comprising a fitting fixed to said transfer member and engageable from the exterior of said housing for applying a rotational and an axial force to said transfer member.

21. The adjuster of claim 19, wherein said normally engaged positive clutch comprises a first set of clutch teeth fixed to the rotatable one of said rod and nut member and extending in a first axial direction therefrom, a second set of clutch teeth fixed to said driven member and extending in the second axial direction therefrom, a third set of clutch teeth fixed to an adjustment barrel and extending in said second axial direction therefrom, said first set of clutch teeth simultaneously engageable with said second and third set of clutch teeth, said adjustment barrel axially and rotationally movable relative to said driven member, a first spring biasing said driven member in said first axial direction, a second spring bearing said rotatable one of said rod and nut members in said first axial direction, said second spring biasing said rotatable one of said rod and nut members into axial abutment with said adjustment barrel for axial movement therewith and wherein said means accessible from the exterior of said housing comprising a fitting fixed to said adjustment barrel and engageable from the exterior of said housing by a tool for applying an axial force in said second axial direction and a rotational force to said adjustment barrel, axial movement of said adjustment barrel in said second axial direction effective to separate said first set of clutch teeth from said second set of clutch teeth while maintaining said first set of clutch teeth in axial engagement with said third set of clutch teeth.

22. The adjuster of claim 21, wherein the axial movement of said first set of clutch teeth in said second axial direction relative to said second set of clutch teeth required to cause disengagement of said first set of clutch teeth from said second set of clutch teeth is greater than the predetermined running clearance.

23. A disc brake actuation assembly including an automatic single acting clearance sensing slack adjuster for maintaining a predetermined running clearance between the brake friction members and the disc, said assembly including;

a support;

a disc rotatable relative to said support;

an actuator housing nonrotationally fixed to said support;

at least one friction member axially movable relative to said support for selective engagement with said disc to retard rotational movement of said disc relative to said support;

a plunger assembly axially movable in said housing, said friction member mounted to one end of said plunger assembly, said plunger assembly comprising a nut member and a rod member threadably engaged at one end thereof to said nut member and carrying said friction member at the other end thereof, said rod member being rotationally fixed to said housing whereby rotation of said nut member in a given direction of rotation will result in axial movement of said friction member relative to said nut member towards said disc and rotation of said nut member in the other direction will result in axial movement of said friction member relative to said nut member away from said disc, said plunger assembly additionally comprising a generally hollow adjuster bushing abutting said nut member at one end thereof and abutting a tappet at the other end thereof, said adjuster bushing rotationally and axially movable relative to said housing;

a wedge actuator assembly mounted to said housing, said wedge actuator assembly comprising an actuator motor, a push-rod and a roller cage assembly mounted to said push-rod, said roller cage assembly engaging the tappet of the plunger assembly and effective upon extension from said actuator motor to force said plunger assembly towards said disc;

a driving member rotatable in said housing, said driving member axially movable with said adjuster bushing and rotatable relative thereto;

means for rotating said driving member in response to greater than predetermined axial displacement of said plunger assembly;

an intermediate member rotatable in said housing, said intermediate member coaxial with said driving member, said intermediate member rotatable relative to said driving member;

a driven member rotatable in said housing, said driven member coaxial with and adjacent said intermediate member, said driven member rotatable relative to said intermediate member, said driven member rotatably and axially connected to the adjuster bushing;

a manual adjustment barrel supported in an inner bore of said adjustment bushing, said manual adjustment barrel axially and rotationally movable relative to said adjustment bushing, one end of said manual adjustment barrel abutting said nut member and the other end of said manual adjustment barrel abutting said tappet;

the end of said nut abutting said manual adjustment barrel defined by a face carrying a plurality of clutch teeth for axial engagement with axially engageable clutch teeth carried by said manual adjustment barrel and simultaneous engagement with clutch teeth carried by said adjustment bushing;

a first spring biasing said driven member and adjustment bushing toward said tappet;

a second spring biasing said nut member toward said tappet and thereby biasing said clutch teeth carried by said nut member into engagement with the clutch teeth carried by said adjustment bushing and the clutch teeth carried by said manual adjuster barrel;

a one-way clutch for rotationally coupling said driving member to said intermediate member;

a force limited coil clutch for rotationally transferring torque from said intermediate member to said driven member, the torque transfer capacity of said force limited clutch in the direction which will rotate said nut member in said given direction of rotation being greater than the torque required to rotate said nut member when said brake friction member and said disc are not in contact but less than the torque required to rotate said nut member when said brake friction member and said disc are in contact;

a fitting provided in said manual adjustment barrel and accessible from the exterior of said housing by a tool for applying an axial and a rotational force to said manual adjustment barrel.

24. The adjuster assembly of claim 23, wherein the axial displacement of said manual adjustment barrel and nut member relative to said adjuster bushing sufficient to result in the clutch teeth carried by said nut member disengaging the clutch teeth carried by said adjustment bushing is greater than said predetermined running clearance.

25. The assembly of claims 23 or 24, wherein said housing and said tappet are provided with bores aligned with said fitting, said bore in said housing provided with a removable plug member.

26. The assembly of claims 23 or 24, wherein said clutch teeth on said nut member, on said manual adjustment barrel, and on said adjustment bushing are face splines.

27. An automatic single acting slack adjuster for a cam actuated expanding shoe drum brake for maintaining a predetermined running clearance between the brake shoe friction pads and the brake drum, said adjuster comprising:

an actuating lever housing adjustably rotationally fixed to said cam, rotation of said lever housing about an axis effective to operate said brake, said lever housing connectable to a brake operating means;

a worm gear rotationally received in said lever, said worm gear rotationally fixed to said cam;

a worm rotatably received in said lever, said worm engaged with said worm gear whereby rotation of said worm in a given direction relative to said lever housing is effective to vary the rotational orientation of said cam relative to said lever housing to reduce the slack in the brake;

a driving member rotatably received in said housing;

means for rotating said driving member in response to greater than predetermined angular displacement of said lever housing;

an intermediate member coaxial with and adjacent said driving member rotatably received in said housing, said intermediate member rotatable relative to said driving member;

a driven shaft coaxial with and adjacent said intermediate member rotatably received in said housing, said driven shaft rotatable relative to said intermediate member;

a worm shaft nonrotationally carrying said worm coaxial with and adjacent said driven shaft rotatably received in said housing, said worm shaft coupled to said driven shaft by a normally engaged positive clutch;

a one-way clutch for rotationally coupling said driving member to said intermediate member;

a force limited coil clutch for rotationally transferring torque from said intermediate member to said driven member, the torque transfer capacity of said force limited clutch in the direction of rotation which will rotate said worm in said given direction of rotation being greater than the torque required to rotate said worm when said brake shoe friction pads are not in contact with said drum but less than the torque required to rotate said worm when said brake shoe friction pads are in contact with said brake drum; and means accessible from the exterior of said lever housing for applying a rotational and an axial force to said worm shaft.

28. The slack adjuster of claim 27, wherein said normally engaged positive clutch comprises a first set of clutch teeth fixed to said worm shaft and extending in a first axial direction, a second set of clutch teeth fixed to said driven shaft and extending in the other axial direction, said first and second clutch teeth adapted for axial engagement, and a spring for biasing said worm shaft in said first axial direction and wherein said means accessible from the exterior of the housing comprises an end of said worm shaft extending from said housing and contoured to receive a tool for applying a rotational force and an axial force in said second axial direction to said worm shaft.

* * * * *